(No Model.)

S. G. DERHAM.
FILTERING FABRIC.

No. 336,799. Patented Feb. 23, 1886.

WITNESSES:
Jos. N. Rosenbaum
Martin Petry

INVENTOR
Samuel G. Derham
BY
Gospel Raegener
ATTORNEYS.

UNITED STATES PATENT OFFICE.

SAMUEL G. DERHAM, OF NEW YORK, ASSIGNOR TO CARL P. LENK, OF BROOKLYN, N. Y.

FILTERING FABRIC.

SPECIFICATION forming part of Letters Patent No. 336,799, dated February 23, 1886.

Application filed December 18, 1885. Serial No. 186,108. (No model.)

*To all whom it may concern:*

Be it known that I, SAMUEL G. DERHAM, of the city, county, and State of New York, have invented certain new and useful Improvements in Filtering Fabrics, of which the following is a specification.

This invention relates to an improved filtering fabric that can be readily made up into bags for filtering liquids of all kinds, or used as a filtering body in filtering apparatus of all kinds; and the invention consists of a filtering fabric made of a number of layers of blotting-paper and of covering layers of flannel or other suitable textile fabric, the layers of paper and fabric being stitched together over the entire face of the filtering fabric.

Figure 1:
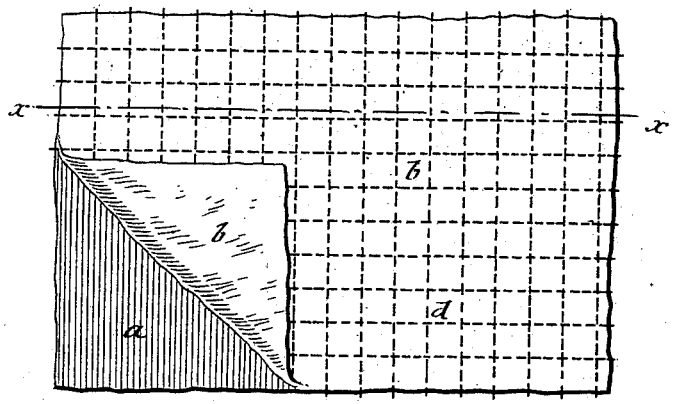
Figure 2:
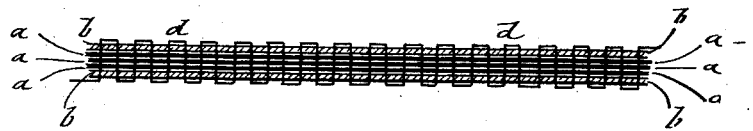

In the accompanying drawings, Figure 1 represents a front view of my improved filtering fabric; and Fig. 2 a longitudinal section of the same on line *x x*, Fig. 1.

Similar letters of reference indicate corresponding parts.

Referring to the drawings, *a a* represents a number of layers of thick filtering or blotting paper. *b b* are the covering-layers, of flannel or other suitable textile fabric, which are united to the intermediate layers of filtering paper by intersecting lines of stitches *d d*, as shown in Figs. 1 and 2. The stitches bind the material composing the filtering fabric firmly together, so that it can be worked up into bags of any suitable shape, or used in filtering apparatus of all kinds.

The filtering fabric can be washed and used for a considerable length of time, until the intermediate layers of blotting-paper gradually lose their cohesion.

The fabric is applicable to the filtering of all kinds of liquids, as it retains the sediments or impurities, and forms a cheap, clean, and effective filtering material.

Having thus described my invention, I claim as new and desire to secure by Letters Patent—

As an improved article of manufacture, a filtering fabric formed of intermediate layers of filtering or blotting paper and layers of textile fabric united by stitches over the entire face of the fabric, substantially as set forth.

In testimony that I claim the foregoing as my invention I have signed my name in presence of two subscribing witnesses.

SAML. G. DERHAM.

Witnesses:
PAUL GOEPEL,
MARTIN PETRY.